(12) United States Patent
Etzlstorfer et al.

(10) Patent No.: US 10,836,139 B2
(45) Date of Patent: Nov. 17, 2020

(54) THREE-LAYERED COMPOSITE IN THE FORM OF A METAL SHEET OR STRIP, COMPONENT HAVING SUCH A COMPOSITE, AND THE USE THEREOF

(71) Applicant: voestalpine Stahl GmbH, Linz (AT)

(72) Inventors: Christoph Etzlstorfer, Gruenbach (AT); Alois Leitner, Weyregg am Attersee (AT); Reinhard Hackl, Gramastetten (AT)

(73) Assignee: voestalpine Stahl GmbH, Linz (AT)

( * ) Notice: Subject to any disclaimer, the term of this patent is extended or adjusted under 35 U.S.C. 154(b) by 0 days.

(21) Appl. No.: 16/098,484

(22) PCT Filed: May 4, 2017

(86) PCT No.: PCT/EP2017/060727
§ 371 (c)(1),
(2) Date: Nov. 2, 2018

(87) PCT Pub. No.: WO2017/191294
PCT Pub. Date: Nov. 9, 2017

(65) Prior Publication Data
US 2019/0152192 A1    May 23, 2019

(30) Foreign Application Priority Data

May 4, 2016    (EP) .................................... 16168453

(51) Int. Cl.
B32B 15/00    (2006.01)
B32B 15/01    (2006.01)
(Continued)

(52) U.S. Cl.
CPC ............ *B32B 15/011* (2013.01); *B32B 15/01* (2013.01); *C22C 38/001* (2013.01);
(Continued)

(58) Field of Classification Search
None
See application file for complete search history.

(56) References Cited

U.S. PATENT DOCUMENTS 7,694,870 B2    4/2010  Bauder
8,221,898 B2*   7/2012  Becker ................. B32B 15/011
                                                        428/624
(Continued)

FOREIGN PATENT DOCUMENTS

DE        102 58 824 B3    5/2004
DE    10 2007 022453 A1   11/2008
(Continued)

OTHER PUBLICATIONS

International Search Report of PCT/EP2017/060727, dated Aug. 9, 2017.

*Primary Examiner* — Seth Dumbris
*Assistant Examiner* — Kim S. Horger
(74) *Attorney, Agent, or Firm* — Collard & Roe, P.C.

(57) ABSTRACT

A three-layered composite has the form of a metal sheet or strip. A first core layer having a first steel material forms a composite central layer. A second plating layer has a second steel material different from the first steel material. A third plating layer has a third steel material different from the first steel material. The second and third plating layers are roll-plated onto opposite sides of the core layer and form the outer two composite layers. While the composite thickness remains the same, the first steel material thickness varies over the width of the composite. The first steel material extends, and can be press-hardened, continuously over the entire width of the composite material. The second and/or third steel materials, in the plating-layer thickness, follow the variation of the core-layer thickness in opposite directions and have a carbon content lower than that of the first steel material.

19 Claims, 3 Drawing Sheets

(51) Int. Cl.

| | |
|---|---|
| *C22C 38/02* | (2006.01) |
| *C22C 38/38* | (2006.01) |
| *C22C 38/18* | (2006.01) |
| *C22C 38/04* | (2006.01) |
| *C22C 38/00* | (2006.01) |
| *C22C 38/06* | (2006.01) |
| *C22C 38/28* | (2006.01) |
| *C22C 38/32* | (2006.01) |

(52) U.S. Cl.
CPC ............ *C22C 38/002* (2013.01); *C22C 38/02* (2013.01); *C22C 38/04* (2013.01); *C22C 38/06* (2013.01); *C22C 38/18* (2013.01); *C22C 38/28* (2013.01); *C22C 38/32* (2013.01); *C22C 38/38* (2013.01)

(56) References Cited

U.S. PATENT DOCUMENTS

| | | | |
|---|---|---|---|
| 8,535,813 B2 * | 9/2013 | Becker | B32B 15/011 |
| | | | 428/683 |
| 9,902,133 B2 | 2/2018 | Becker et al. | |
| 2017/0297304 A1 * | 10/2017 | Becker | B32B 15/011 |

FOREIGN PATENT DOCUMENTS

| | | |
|---|---|---|
| DE | 10 2013 017798 A1 | 4/2015 |
| DE | 10 2014 111628 A1 | 2/2016 |
| DE | 10 2014 114365 A1 | 4/2016 |
| EP | 2 613 896 B1 | 3/2016 |
| WO | 2009/135779 A1 | 11/2009 |
| WO | 2016/050417 A1 | 4/2016 |

* cited by examiner

THREE-LAYERED COMPOSITE IN THE FORM OF A METAL SHEET OR STRIP, COMPONENT HAVING SUCH A COMPOSITE, AND THE USE THEREOF

CROSS REFERENCE TO RELATED APPLICATIONS

This application is the National Stage of PCT/EP2017/060727 filed on May 4, 2017, which claims priority under 35 U.S.C. § 119 of European Application No. 16168453.5 filed on May 4, 2016, the disclosure of which is incorporated by reference. The international application under PCT article 21(2) was not published in English.

TECHNICAL FIELD

The invention relates to a three-layered composite material in the form of a metal sheet or strip having a first core layer forming a middle course of the composite material and containing a first steel material, and having a second cladding layer containing a second steel material different from the first steel material, and having a third cladding layer containing a third steel material different from the first steel material, wherein the second and third cladding layers are provided by roll-cladding on opposite sides of the core layer and form the outer two courses on the composite material, wherein the thickness of the composite material is constant but the core-layer thickness of the first steel material of the core layer varies over the width of the composite material.

PRIOR ART

In order to impart different mechanical and/or technological properties to a three-layered composite material over its width, it is known from the prior art (DE10258824B2, EP2613896B1) to provide different steel materials that alternate over the width of the core layer of the composite material, in order to vary, in this way, at least the core-layer thickness of a steel material of the core layer over the width of the composite material. For this purpose, very different steel strips, which are joined between two cladding courses provided by a common roll-cladding process, are disposed alongside one another. The cladding courses may contain a steel alloy different from the steel strips of the core. It has proved disadvantageous that, despite the joining by roll-cladding, an unexpectedly weak joint may be obtained between the abutting steel materials in the core layer. Thus an unsatisfactory mechanical load capability of the composite material can be expected. Such composite materials are therefore unsuitable or suitable to only a limited extent for a vehicle structure, especially bodywork structure.

It is possible to attempt to counteract these disadvantages with a suitable choice of alloys for the steel materials and/or with a narrow process window during roll-cladding, but the costs of manufacture of the composite material are then increased or else its universal usability may be reduced.

In addition, five-layered composite materials are known from the prior art (DE102014114365A1). These each have, between a core layer of a steel material of high strength and outer cladding layers of a steel material of low strength, an intermediate layer of several steel materials of different strength. Such a five-layer composite material is relatively difficult to roll-clad and therefore is cost-intensive. This likewise necessitates narrow process windows during its further use for hot-stamping, which has a detrimental effect on the handling of the composite material.

PRESENTATION OF THE INVENTION

It is therefore the object of the invention to change a three-layered composite material of the type depicted in the introduction, manufactured by roll-cladding and having a varying core-layer thickness, in such a way that it is reliably suitable for a vehicle structure by virtue of its high mechanical load capability.

The invention achieves the stated object by the fact that the first steel material of the core layer extends continuously over the entire width of the composite material and is hot-stampable, wherein the second and/or third steel materials of the cladding layers inversely follow, in the cladding-layer thickness, the variation of the core-layer thickness, as well as have a carbon content lower than that of the first steel material.

If the first steel material of the core layer extends continuously over the entire width of the composite material, and if it is hot-stampable, it is possible to create therewith, in the core layer, a zone with the nature of a core chord, capable of assuring at least a minimum degree of mechanical load capability of the composite material. The inventive composite material may therefore reliably fulfill required mechanical load capabilities that are applicable, for example, to components for a vehicle structure. In addition, since this hot-stampable core chord inherently excludes a bond of reduced strength—as occurs, for example, in the prior art at the abutting face of steel materials provided alongside one another—the composite material may be subjected without concern to roll-cladding even when the second and/or third steel materials of the cladding layers inversely follow, in the cladding-layer thickness, the variation of the core-layer thickness as well as contain a lower carbon content than that of the first steel material. In addition, via this last-mentioned content, the ductile behavior of the composite material can be adjusted—which may be favorable for diverse applicability of the composite material. In addition, due to the inverse thickness compensation by the second and/or third steel material, a constant thickness of the composite material can be ensured, which may act positively on further processes of forming of the composite material. In particular, this may guarantee that a component can be manufactured reproducibly by hot-stamping or press-hardening of the composite material, because of the fact that the modulus of elasticity is substantially equal over the width of the composite material.

The composite material may be further improved when the second and third steel materials of the cladding layers inversely follow, in their cladding-layer thicknesses, the variation of the core-layer thickness.

Preferably, the core layer is symmetrically constructed, whereby the composite material may be distinguished by its ease of handling during hot-stamping or press-hardening.

Preferably, the carbon content of the steel materials of core layer and of the two cladding layers is lower than 0.8 mass %.

A core layer that is particularly mechanically stable may be created when the first steel material is a steel alloy that can be hot-stamped with relatively high strength or that can be hot-stamped with high strength.

For this purpose, preferably a manganese-boron steel, especially 20MnB8, 22MnB5 or 32MnB5 steel, may be excellent as the first steel material.

Preferably, a steel alloy is suitable as the first steel material that contains

| | | |
|---|---|---|
| 0.08 to 0.6 | mass % | carbon (C), |
| 0.8 to 3.0 | mass % | manganese (Mn), |
| 0.01 to 0.07 | mass % | aluminum (Al), |
| 0.01 to 0.5 | mass % | silicon (Si), |
| 0.02 to 0.6 | mass % | chromium (Cr) |
| 0.01 to 0.08 | mass % | titanium (Ti), |
| <0.02 | mass % | nitrogen (N), |
| 0.002 to 0.02 | mass % | boron (B), |
| <0.01 | mass % | phosphorus (P), |
| <0.01 | mass % | sulfur (S), |
| <1 | mass % | molybdenum (Mo) | and
the rest as iron as well as smelting-related impurities. As the first steel material, a steel alloy is also conceivable that contains

| | | |
|---|---|---|
| 0.08 to 0.30 | mass % | carbon (C), |
| 1.00 to 3.00 | mass % | manganese (Mn), |
| 0.03 to 0.06 | mass % | aluminum (Al), |
| 0.01 to 0.20 | mass % | silicon (Si), |
| 0.02 to 0.3 | mass % | chromium (Cr) |
| 0.03 to 0.04 | mass % | titanium (Ti), |
| <0.007 | mass % | nitrogen (N), |
| 0.002 to 0.006 | mass % | boron (B), |
| <0.01 | mass % | phosphorus (P), |
| <0.01 | mass % | sulfur (S), |
| <1 | mass % | molybdenum (Mo) | and
the rest as iron as well as smelting-related impurities.

A core layer that is particularly mechanically stable may be created when the first steel material has an Mn content that is greater than or equal to 0.8 wt %.

The ductility of the composite material may be increased when the second and/or third steel material is a microalloyed steel, for example HC460LA, HC500LA or HC340LA steel. An IF steel, for example an HC220Y steel, is likewise conceivable.

Preferably, the second and third steel materials may consist of the same steel types, in order, for example, to facilitate therewith the handling of the composite material during forming. For example, the second and third steel material may be an HC220Y steel or even an HC460LA steel.

It may be advantageous when the first steel material is a 20MnB8 steel and the second and third steel materials are an HC220Y steel. Alternatively, it may also be advantageous when the first steel material is a 32MnB5 steel and the second and third steel materials are an HC460LA steel. With these steel combinations, the courses of the composite material may be further matched to one another with respect to the mechanical parameters, in order, for example, to improve the forming and/or failure behavior of the composite material therewith.

Preferably, the thickness of the composite material is between 0.5 and 3 mm, for example between 1 and 2 mm.

Preferably, the core-layer thickness is between 30 and 90%, for example between 50 and 85% of the thickness of the composite material, so that, given a strength of the composite material that is as high as possible, the ductility can be optimized at the same time.

A relatively homogeneous transition between the different thicknesses of the courses may be created when the boundary contour between core layer and the cladding layers, the steel materials of which inversely follow, in the cladding-layer thickness, the varying core-layer thickness, is oriented obliquely relative to this contour region of the varying core-layer thickness.

The inventive composite material may be suitable in particular for a plate for a forming process, for example for press-hardening deep-drawing. Among other reasons, this is the case due to the continuous core layer. A component for a vehicle structure comprising a hot-stamped plate according to the invention may guarantee the highest mechanical properties.

The inventive hot-stamped composite material may be particularly suitable for a vehicle structure, for example bodywork structure.

BRIEF DESCRIPTION OF THE DRAWINGS

By way of example, the subject matter of the invention will be illustrated in more detail in the figures, on the basis of several embodiment variants, wherein.

WAYS OF WORKING THE INVENTION

Figure 1:
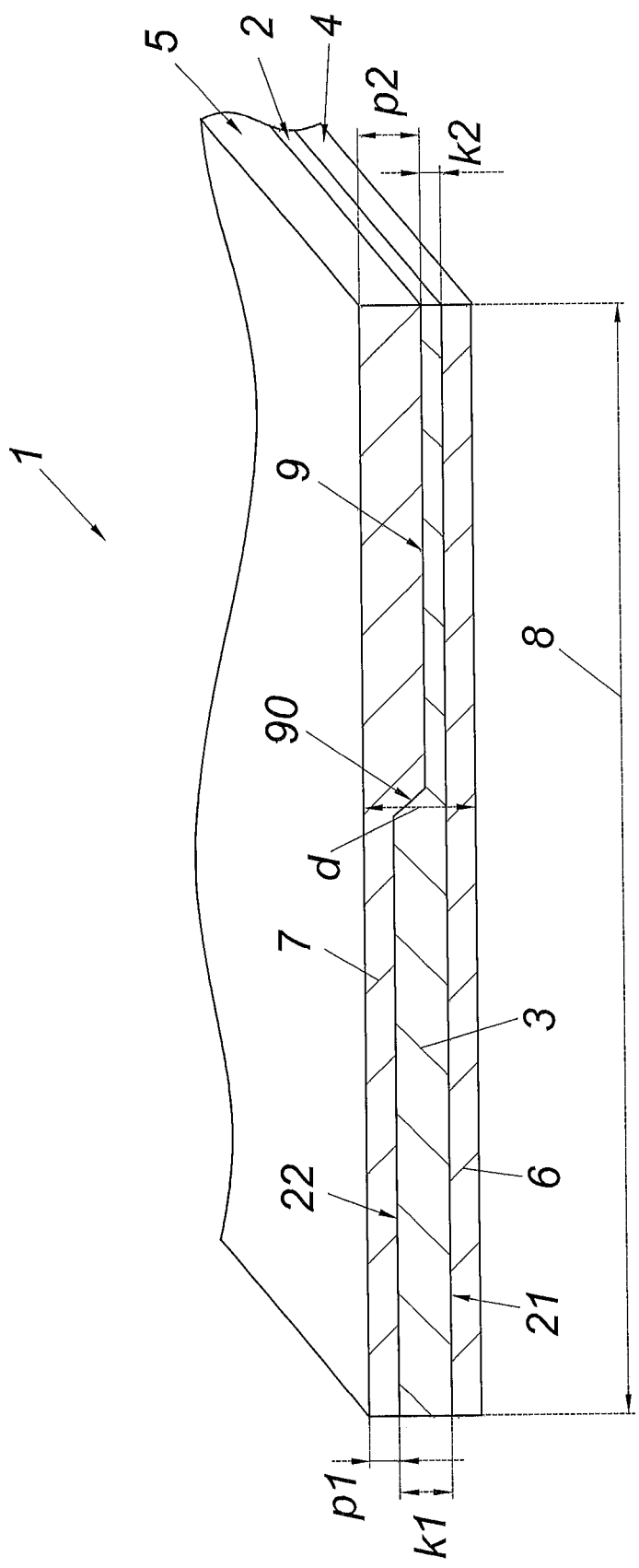
FIG. 1 shows a composite material, cut along the broad side, in 3D view according to a first exemplary embodiment.

According to FIG. 1, a composite material 1 is illustrated that is formed by three courses of steel materials. Thus a core layer 2 of a first steel material 3 is evident as the middle course, which is equipped on each of the two sides, namely on opposite sides 21, 22 of the core layer 2, with a first cladding layer 4 and with a second cladding layer 5, which form the two outer courses on composite material 1. These two cladding layers 4, 5 each comprise a second and third steel material 6, 7, which two steel materials 6, 7 have a lower carbon content than that of first steel material 3.

The core-layer thickness of first steel material 3 of core layer 2 varies over width 8 of composite material 1, as can be seen on the basis of the different core-layer thicknesses k1, k2 in FIG. 1.

According to the invention, first steel material 3 of core layer 2 extends continuously over the entire width 8 of composite material 1—and is likewise hot-stampable, for example, by the fact that a steel alloy with an Mn content higher than or equal to 0.8 wt % is used. A first steel material having the following alloy composition (all numbers in mass %) is suitable as the first hot-stampable or press-hardenable steel material 3:

| C [%] | Si [%] | Mn [%] | P [%] | S [%] | Al [%] | Cr [%] | Ti [%] | B [%] | N [%] |
|---|---|---|---|---|---|---|---|---|---|
| 0.20 | 0.18 | 2.01 | 0.0062 | 0.001 | 0.054 | 0.03 | 0.032 | 0.0030 | 0.0041 | the rest as iron and smelting-related impurities, wherein especially the alloying elements boron, manganese and optionally chromium and molybdenum are used as transformation retarders in such steels. A different manganese-boron steel, for example of the 22MnB5 or 32MnB5 type, is also conceivable. Thus core layer 2 is prepared in particular on the joint during roll-cladding and is able to enter into a stable bond with the cladding or with cladding layers 4, 5.

The thickness d of the three-layered composite material 1, 100, 200 is constant but the core-layer thickness k of the first steel material of the core layer 2 varies over the width 8 of the three-layered composite material. In addition, third steel material 7 of cladding layer 5 inversely follows, in the cladding-layer thickness p1, p2, the variation of core-layer thickness k1, k2, as can be seen in the middle of composite material 1. Here, contour region 90 is oriented obliquely relative to boundary contour 9 between the two courses, as is evident at the transition from cladding-layer thickness p1 or core-layer thickness k1 to cladding-layer thickness p2 or core-layer thickness k2. This obliquely oriented contour region 90 creates a relatively homogeneous transition and leads to advantageous mechanical properties of three-layered composite material 1.

In addition, the carbon content of third steel material 7 is lower than the carbon content of first steel material 3—preferably, second and third steel materials 6, 7 are identical alloys and consist of a steel material of HC340LA type. An HC220Y steel is likewise conceivable.

Thus first steel material 3 of core layer 2, in combination with second and third steel materials 6, 7, ensures that composite material 1 is able to fulfill those mechanical characteristics that are required by a component of a vehicle structure.

Figure 2:
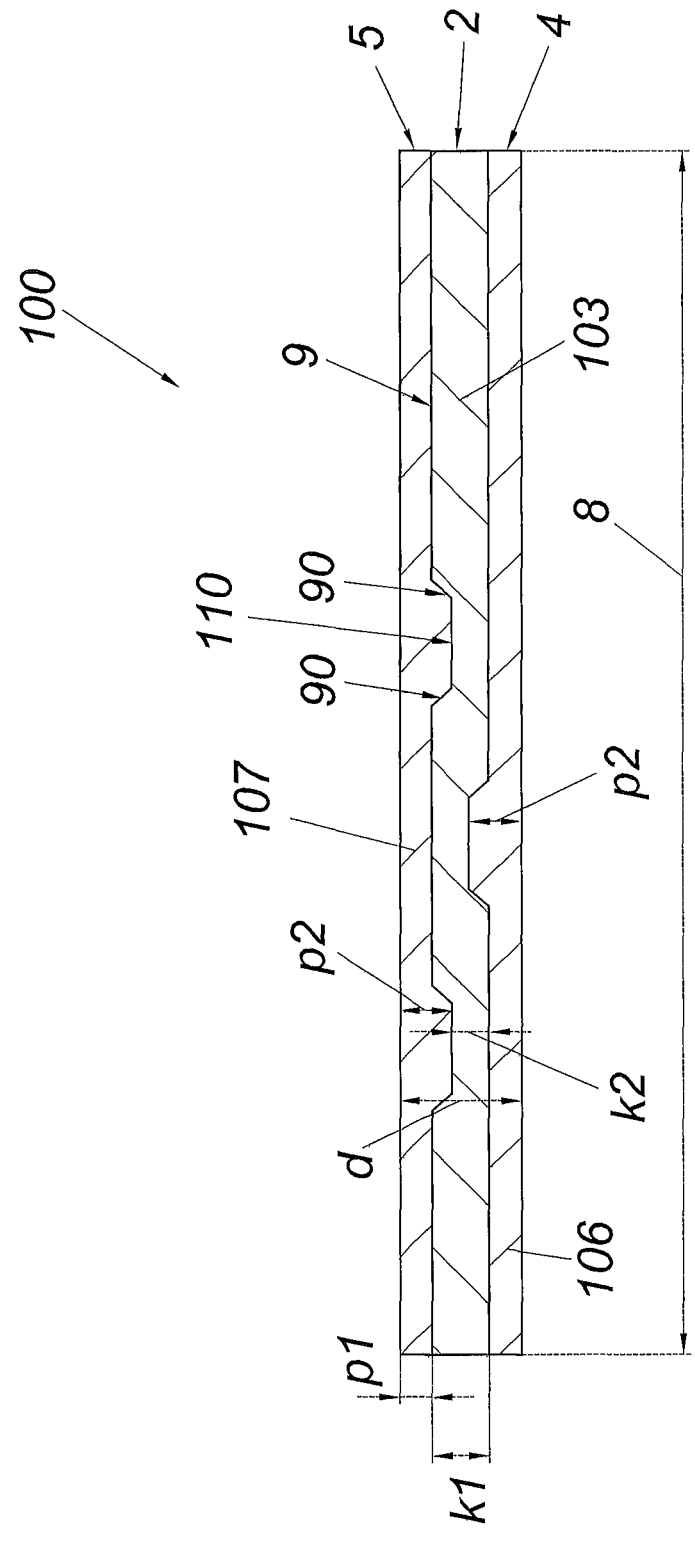
FIG. 2 shows a side view of another composite material according to a second exemplary embodiment and FIG. 3 shows a side view of a further composite material according to a third exemplary embodiment.

Corresponding to FIG. 2, another three-layered composite material 100 is shown, wherein its core layer 2 and cladding layers 4, 5 vary differently compared with composite material 1 illustrated according to FIG. 1. Here, core-layer thickness k1, k2 of first steel material 103 of core layer 2 varies multiple times over width 8 of composite material 100 and in some regions forms recessed bead-like regions 110. Second and/or third steel material 106, 107 of cladding layers 4, 5 inversely follow, in the cladding-layer thickness p1, p2, the variation of core-layer thickness k1, k2. Here also, boundary contour 9 in contour region 90 of varying core-layer thickness is obliquely oriented.

Figure 3:
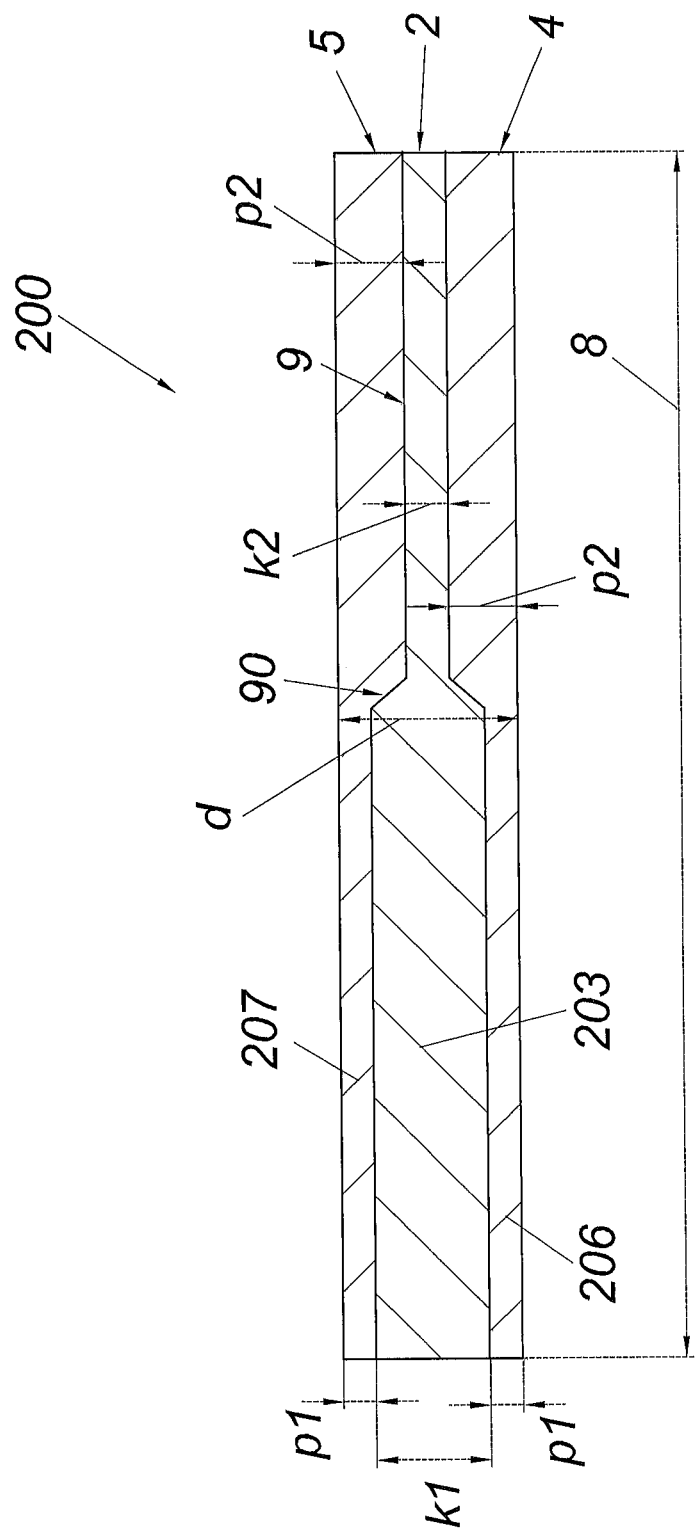

Corresponding to FIG. 3, a further three-layered composite material 200 is shown, wherein its core layer 2 is constructed symmetrically in comparison with the other exemplary embodiments. Here also, core-layer thickness k1, k2 of first steel material 203 of core layer 2 varies, and second and third steel materials 206, 207 of second and third cladding layers 4, 5 follow this variation inversely. Here also, boundary contour 9 in contour region 90 of varying core-layer thickness k1, k2 is obliquely oriented, as may be inferred from FIG. 3.

The invention claimed is:

1. A three-layered composite material comprising a metal sheet or strip, the three-layered composite material comprising:
 a first core layer forming a middle course on the three-layered composite material and containing a first steel material;
 a second cladding layer containing a second steel material different from the first steel material; and
 a third cladding layer containing a third steel material different from the first steel material;
 wherein the second and third cladding layers are provided by roll-cladding on opposite sides of the core layer and form the outer two courses on the three-layered composite material;
 wherein the thickness of the three-layered composite material is constant but the core-layer thickness of the first steel material of the core layer varies over the width of the three-layered composite material;
 wherein the first steel material of the core layer extends continuously over the entire width of the three-layered composite material and is hot-stampable;
 wherein the second and/or third steel material of the cladding layers inversely follow, in the cladding-layer thickness, the variation of the core-layer thickness, and the second and/or third steel material have a carbon content lower than that of the first steel material; and
 wherein a boundary contour between the first core layer and the third cladding layer is oriented obliquely in a transition contour region of the varying core-layer thickness between a first core-layer thickness and a second core-layer thickness.

2. The three-layered composite material according to claim 1, wherein the second and third steel material of the cladding layers inversely follow, in their cladding-layer thicknesses, the variation of the core-layer thickness.

3. The three-layered composite material according to claim 2, wherein the core layer is symmetrically constructed.

4. The three-layered composite material according to claim 1, wherein the carbon content of the steel materials of core layer and of the two cladding layers is lower than 0.8 mass %.

5. The three-layered composite material according to claim 1, wherein the first steel material is a higher strength, hot-stampable steel alloy or a high strength, hot-stampable steel alloy.

6. The three-layered composite material according to claim 1, wherein the first steel material is a manganese-boron steel.

7. The three-layered composite material according to claim 1, wherein the first steel material contains

| 0.08 to 0.6 | mass % | carbon (C), |
| 0.8 to 3.0 | mass % | manganese (Mn), |
| 0.01 to 0.07 | mass % | aluminum (Al), |
| 0.01 to 0.5 | mass % | silicon (Si), |
| 0.02 to 0.6 | mass % | chromium (Cr), |
| 0.01 to 0.08 | mass % | titanium (Ti), |
| <0.02 | mass % | nitrogen (N), |
| 0.002 to 0.02 | mass % | boron (B), |
| <0.01 | mass % | phosphorus (P), |
| <0.01 | mass % | sulfur (S), |
| <1 | mass % | molybdenum (Mo) | and
 the rest as iron as well as smelting-related impurities.

8. The three-layered composite material according to claim 1, wherein the first steel material contains

| 0.08 to 0.30 | mass % | carbon (C), |
| 1.00 to 3.00 | mass % | manganese (Mn), |
| 0.03 to 0.06 | mass % | aluminum (Al), |
| 0.01 to 0.20 | mass % | silicon (Si), |
| 0.02 to 0.3 | mass % | chromium (Cr), |
| 0.03 to 0.04 | mass % | titanium (Ti), |
| <0.007 | mass % | nitrogen (N), |

| | | |
|---|---|---|
| 0.002 to 0.006 | mass % | boron (B), |
| <0.01 | mass % | phosphorus (P), |
| <0.01 | mass % | sulfur (S), |
| <1 | mass % | molybdenum (Mo) | and
the rest as iron as well as smelting-related impurities.

9. The three-layered composite material according to claim 1, wherein the first steel material has an Mn content of greater than or equal to 0.8 wt %.

10. The three-layered composite material according to claim 1, wherein the second and/or third steel material is a microalloyed steel, or IF steel.

11. The three-layered composite material according to claim 1, wherein the second and third steel materials comprise the same steel type.

12. The three-layered composite material according to claim 1, wherein the first steel material is a 20MnB8 steel and the second and third steel materials are an HC220Y steel, or the first steel material is a 32MnB5 and the second and third steel materials are an HC460LA.

13. The three-layered composite material according to claim 1, wherein the thickness of the composite material is between 0.5 and 3 mm.

14. The three-layered composite material according to claim 1, wherein the core-layer thickness is between 30 and 90% of the thickness of the composite material.

15. A component for a vehicle structure comprising a hot-stamped plate having the three-layered composite material according to claim 1.

16. A vehicle structure comprising a hot-stamped three-layered composite material according to claim 1.

17. The three-layered composite material according to claim 6, wherein the manganese-boron steel is 20MnB8, 22MnB5 or 32MnB5 steel.

18. The three-layered composite material according to claim 1, wherein the second and/or third steel material is HC460LA, HC500LA, HC340LA, or HC220Y steel.

19. The three-layered composite material according to claim 1, wherein the thickness of the composite material is between 1 and 2 mm.

* * * * *